United States Patent [19]

Mitsuhashi et al.

[11] Patent Number: 5,696,499
[45] Date of Patent: Dec. 9, 1997

[54] INFORMATION PROCESSING SYSTEM CONNECTED BY RADIO COMMUNICATION

[75] Inventors: Shunya Mitsuhashi, Tokyo; Ken Onodera, Yokohama, both of Japan

[73] Assignee: Canon Kabushiki Kaisha, Tokyo, Japan

[21] Appl. No.: 288,736

[22] Filed: Aug. 16, 1994

Related U.S. Application Data

[63] Continuation of Ser. No. 790,522, Nov. 21, 1991, abandoned.

[30] Foreign Application Priority Data

| Nov. 14, 1990 | [JP] | Japan | 2-306226 |
| Nov. 14, 1990 | [JP] | Japan | 2-306229 |
| Nov. 20, 1990 | [JP] | Japan | 2-312656 |
| Oct. 11, 1991 | [JP] | Japan | 3-290318 |

[51] Int. Cl.$^6$ ............................................. H04Q 1/00
[52] U.S. Cl. ................. 340/825.69; 455/343; 364/518
[58] Field of Search ................... 455/343; 340/825.69, 340/825.72, 825.73, 825.74, 825.76, 310 A, 310 R; 400/708; 364/518; 379/90

[56] References Cited

U.S. PATENT DOCUMENTS

| 4,051,326 | 9/1977 | Badagnani et al. | 179/2 DP |
| 4,122,299 | 10/1978 | Cannon | 358/141 |
| 4,155,042 | 5/1979 | Permut et al. | 455/343 |
| 4,206,444 | 6/1980 | Ferlan | 340/147 |
| 4,247,908 | 1/1981 | Lockhart, Jr. et al. | 364/900 |
| 4,313,227 | 1/1982 | Eder | 455/617 |
| 4,530,613 | 7/1985 | Horman et al. | 400/708 |
| 4,539,437 | 9/1985 | Giacopelli | 379/90 |
| 4,722,064 | 1/1988 | Suzuki | 364/518 |
| 5,003,578 | 3/1991 | Lin | 379/90 |
| 5,027,428 | 6/1991 | Ishiguro et al. | 455/343 |

FOREIGN PATENT DOCUMENTS

| 0176342 | 4/1986 | European Pat. Off. . | |
| 9013872 | 11/1990 | WIPO | G06F 13/40 |

*Primary Examiner*—Brian Zimmerman
*Attorney, Agent, or Firm*—Fitzpatrick, Cella, Harper & Scinto

[57] ABSTRACT

To control an information processing system in which a host unit is connected by radio communication to a slave unit, the host unit transmits data and a selected one of plural carrier waves both containing ID information to select a specific information process. The slave unit recognizes the ID information which corresponds to the frequency of the selected carrier wave and performs its operation accordingly. A difference in frequencies of the carrier waves may be used as a type of ID information.

10 Claims, 10 Drawing Sheets

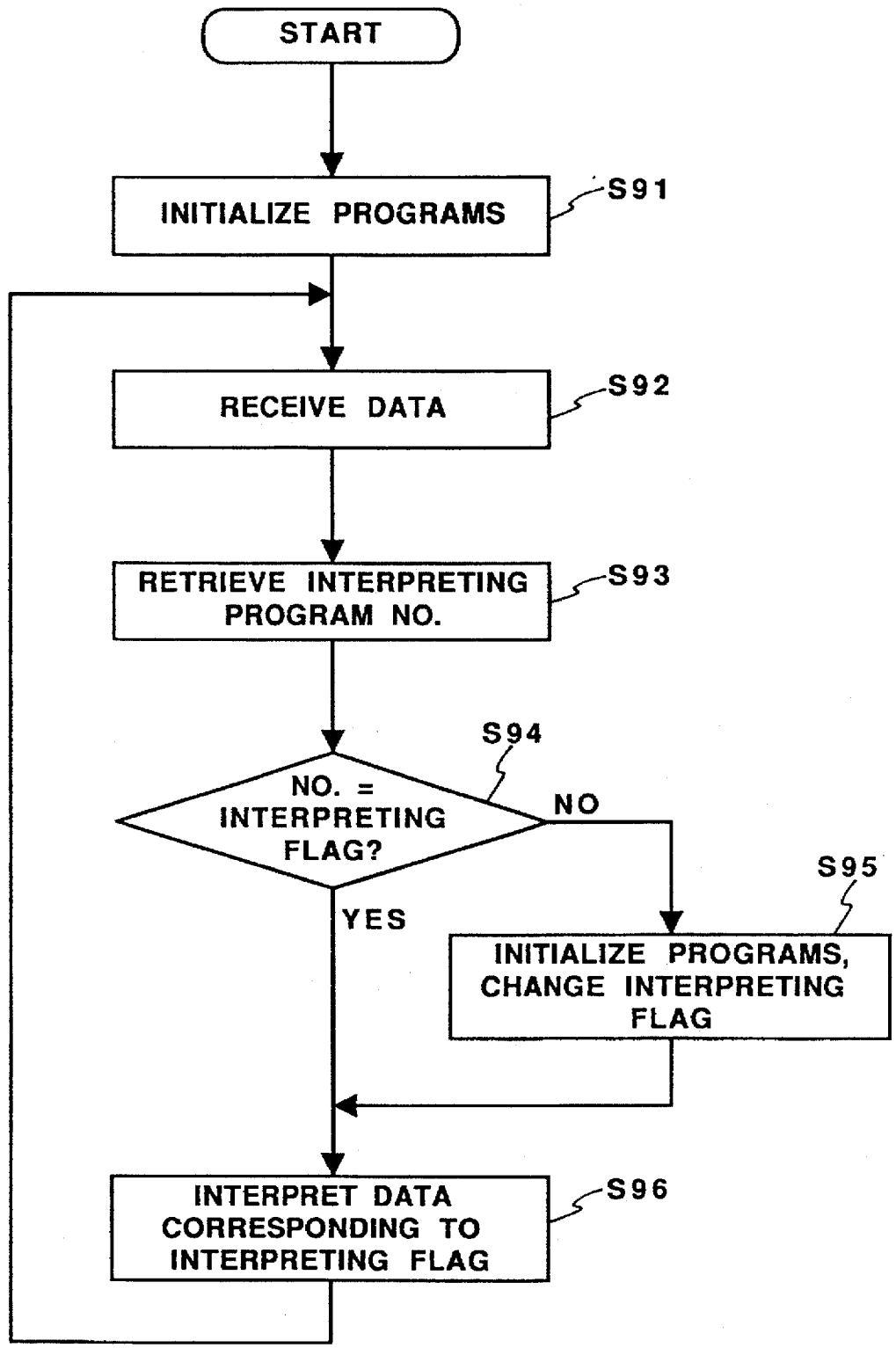
F I G. 9

INFORMATION PROCESSING SYSTEM CONNECTED BY RADIO COMMUNICATION

This application is continuation of application Ser. No. 07/790,522 filed Nov. 12, 1991, now abandoned.

BACKGROUND OF THE INVENTION

1. Field of the Invention

The present invention relates to an information processing system connected by radio communication between a host unit, such as a host computer, and a slave unit performing a discrete process, such as a printing process, so that data can be transmitted therebetween on carrier waves, such as radiowaves, supersonic waves or light beams. This invention also relates to a method of controlling such a system, and may be applied to various systems, particularly those composed of a plurality of host units and one or more slave units.

2. Description of the Related Art

Information processing systems have hitherto been connected by wire to peripheral units near these systems. Public or private lines are necessary to connect the information processing system to the peripheral units in remote areas. It has become possible in recent years to use radio communication to connect host units to slave units, both types of units constituting an information processing system, and consequently, to arrange various units remote from the host units. However, as connection by radio communication proliferates, various disadvantages occur.

Problems will be described below, especially those pertaining to an information processing system composed of a host computer and a printing system. Similar problems may also occur in other types of information processing systems.

When a printing system is constructed in which a printing system is connected by wire to a host computer, the printing system is disposed near the host computer. Because of such arrangement, the user does not have much trouble turning electric power (hereinafter written simply as power) to the printing system on and off.

However, in most cases, the printing system capable of radio communication is arranged in an area remote from the external unit serving as a host computer and within a distance where data can be transmitted to and from the external unit.

In such a case, the operator at the host computer must go to the printing system to turn the power to the printing system on and off before and after a printing process is performed. Such an operation is very complicated, and if the printing process is interrupted for a long period of time, electricity is wasted and therefore cannot be saved.

The printing system, one of the slave units constituting the above information processing system, prints all data transmitted from the host computer.

When a plurality of printing systems are arranged near the host computer, these systems simultaneously start to print data sent from the host computer. To avoid such a disadvantage, it is necessary to provide a means for specifying the printing systems. It is possible to employ a method in which reception frequencies are provided to printing systems which frequencies are specific to such systems. However, the reception frequencies cannot be provided to all printing systems because of the limited number of frequency bands.

When a general-purpose printing system, a type of slave unit in the above information processing system, receives data through radiowaves or another medium and performs a printing process, data interpreting portions are changed by switches on a panel in accordance with the frequency of a carrier wave (first method), or are changed by a command, for switching the data interpreting portions, contained in data (second method).

However, the first method is inconvenient because when the information processing system is controlled by radiowaves in a remote-control manner, the operator must go to the switches on the panel of the printing system remote from the host computer. Since the second method cannot switch the data interpreting portions until the above command is recognized, it is necessary to previously determine which data interpreting portion is operating.

Though the data interpreting portions are provided in accordance with language systems, it is difficult for printing systems with different language systems to have a common switching command.

SUMMARY OF THE INVENTION

The present invention has been made to solve the disadvantages mentioned above. An object of this invention is to provide an information processing system and a method of controlling the system capable of controlling a state of the slave unit exactly by adding a simple function to the system.

To achieve the above object, a method of controlling an information processing system in which a host unit is connected by radio communication to a slave unit comprises the steps of transmitting by the host unit data and a carrier wave both including identification information which selects a specific information process, and determining the operation of the slave unit and performing the information process by the slave unit, on the basis of said identification information. In this invention, the identification information includes power-on information and power-off information that turn electric power to the slave unit on and off. Only when no host units are accessing the slave unit, the electric power to the slave unit will be turned off in accordance with the power-off information. The identification information includes another type of information which selects a predetermined information process performed by a specific slave unit, and only a slave unit selected performs the predetermined information process. The identification information further includes another type of information which selects specific language systems, and a slave unit having the specific language systems performs the predetermined information process. The identification information further includes the frequency of a carrier wave. Further, the slave unit has a plurality of language systems, and performs the information process after having selected a specific language system on the basis of said identification information. The slave unit is provided with the frequency of the carrier wave and a means for reserving access, wherein the slave unit transmits to the host unit data indicating that the slave unit can be accessed through the frequency of the carrier wave reserved, and when the host unit receives such data, it transmits processing data.

To achieve the above object, an information processing system comprising at least one host unit which transmits data and a carrier wave both including identification information which selects a specific information process and at least one slave unit which determines its operation and performs the information process on the basis of said identification information, wherein the host unit is connected by radio communication to the slave unit. In this invention, the identification information includes the frequency of a carrier wave.

Another object of this invention is to provide an information processing system capable of automatically turning on and off the power to a slave unit disposed in an area remote from a plurality of host computers. Power is turned on and off in accordance with the status of a carrier wave signal transmitted from the host computers. As a result, the operator does not have much trouble in turning power to the slave unit on and off, and power consumption can be saved.

Another object of this invention is to provide a method of controlling such an information processing system.

To achieve the above object, a radio printing system comprises line switching means for switching a line to a plurality of external units, monitoring means for monitoring the level at which a carrier signal is received from the external units, power operating means for turning the power to printing means on and off, and power controlling means for controlling the power operating means so that the power operating means can control power supply to the printing means, on the basis of the outputs from the line switching means and the monitoring means.

A radio printing system comprises line switching means for switching a line to a plurality of external units, monitoring means for monitoring the level at which a carrier signal is received from the external units, power operating means for turning power to printing means on and off, and power controlling means for controlling the power operating means so that the power operating means can control power supply to the printing means, on the basis of the line switching means and a power control command transmitted by radio from the external units.

The radio printing system is constructed so that the power controlling means cannot perform power control until a printing process in progress is completed.

A radio printing system comprises monitoring means for monitoring the level at which a carrier signal is received from external units, power operating means for turning power to printing means on and off, and power controlling means for controlling the power operating means so that the power operating means can control power supply to the printing means, on the basis of the output from the monitoring means.

A radio printing system comprises monitoring means for monitoring the level at which a carrier signal is received from external units, power operating means for turning power to printing means on and off, and power controlling means for controlling the power operating means so that the power operating means can control power supply to the printing means, on the basis of a power control command transmitted by radio from the external units.

In this invention, the monitoring means always monitors the levels at which the carrier signals are received from the external units. On the basis of the output from the monitoring means and the status of the line switching means for a plurality of host computers, the power controlling means controls the power operating means so that the power operating means can turn the power to the printing means on and off. Therefore power to the radio printing system can be automatically turned on and off in accordance with the status of data transmission from the external units.

Also, the power controlling means controls the power operating means so that the power operating means can control power supply to the printing means, on the basis of the power control command transmitted by radio from the external units. At any time it is thus possible to turn power to the radio printing system on and off in a remote-control manner.

The power controlling means cannot interrupt the power to the printing system in a remote-control manner until a printing process in progress is completed.

As mentioned above, the monitoring means always monitors the levels at which the carrier signals are received from the external units. The power controlling means controls the power operating means so that the power operating means can turn the power to the printing means on and off on the basis of the output from the monitoring means. Thereby power to the radio printing system can be automatically turned on and off in accordance with the status of data transmission from the external units.

Also, the power controlling means controls the power operating means so that the power operating means can control power supply to the printing means, on the basis of the power control command transmitted by radio from the external units. At any time it is thus possible to turn power to the radio printing system on and off in a remote-control manner.

Still another object of the present invention is to provide a simply constructed information processing system capable of selecting a slave unit, and consequently, of eliminating repetition of a process.

Yet another object of this invention is to provide a method of controlling such an information processing system.

To achieve the above objects, this invention provides an information processing system for performing a process after it has received data transmitted by radio communication from an external unit, the information processing system comprising terminal ID information for specifying an information processing terminal, contained in the data transmitted; means for determining whether terminal ID information received agrees with the information processing terminal; wherein when the terminal ID information received agrees with the information processing terminal, the process is performed in accordance with another type of information transmitted. Thus, though the information processing system is simply constructed, it is capable of specifying the terminal and of eliminating repetition of the process.

A further object of the present invention is to provide an information processing system capable of switching data interpreting portions by simply identifying the frequency of a carrier wave for transmitting data.

An even further object of this invention is to provide a method of controlling such an information processing system.

Another object is to provide an information processing system capable of switching data interpreting portions, without depending on language systems.

Yet another object is to provide a method of controlling such an information processing system.

To achieve the above objects, this invention provides an information processing system comprising means for identifying the frequency of a carrier wave; and means for modifying a process program in accordance with the identified frequency; wherein a process is performed in accordance with an input signal received from a remote area.

The above objects, constructions and the advantages of the present invention, together with further objects, constructions and advantages, will become apparent from the detailed description of the preferred embodiments with reference to the accompanying drawings.

BRIEF DESCRIPTION OF THE DRAWINGS

FIG. 9 is a flowchart showing a process for switching data interpreting portions of the printing system according to the third embodiment.

DESCRIPTION OF THE PREFERRED EMBODIMENTS

[Function for controlling electric power supply to slave unit]

Figure 1:
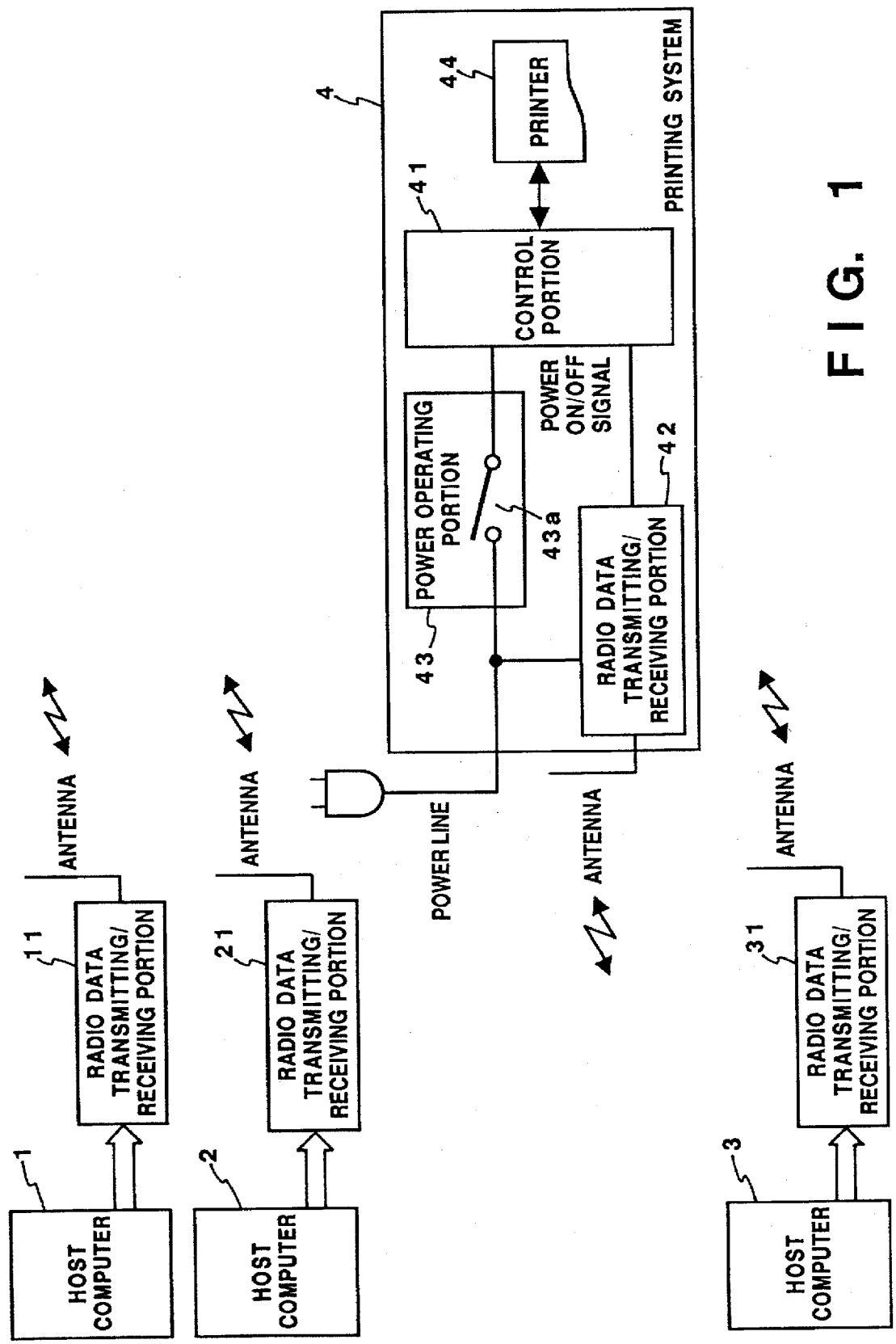
FIG. 1 is a block diagram showing a structure of a radio printing system in accordance with a first embodiment of the present invention.

FIG. 1 is a block diagram showing a structure of a radio printing system in accordance with a first embodiment of the present invention.

In FIG. 1, numerals 1 to 3 all denote host computers which output information on printing to a radio printing system 4 (hereinafter called simply a printing system 4) through radio data transmitting/receiving portions 11, 21 and 31, respectively. The information on printing is composed of print data and control codes.

The radio data transmitting/receiving portions 11, 21 and 31 may possess either frequencies or ID numbers, both of which are specific to the corresponding host computers 1, 2 and 3.

The printing system 4 is composed of a control portion 41, a radio data transmitting/receiving portion 42 (hereinafter referred to as a data communicating portion 42), a power operating portion 43 and a printer 44. The control portion 41 controls the entire printing system 4. Several means, such as a means for radio communication, a means for monitoring levels at which a carrier wave is received (the reception level of a carrier wave), and a means for switching a line to cope with a plurality of host computers, are provided in the data communicating portion 42. A carrier wave for radio communication purposes is not limited to a specific medium in this embodiment, but may be used as long as it satisfies frequency characteristics, such as those of radiowaves, ultrasonic waves and light beams. Radio communication is used to transmit the print data and the control codes between the host computers 1 to 3. Electric power (hereinafter written simply as power) is always applied to the data communicating portion 42, regardless of whether a power switch 43a is turned on and off, as long as the power is supplied to the power cord of the printing system 4. The power operating portion 43 controls power supply to components other than the data communicating portion 42. It turns the power switch 43a on and off on the basis of commands from the control portion 41 and the data communicating portion 42.

The printer 44 forms a permanently visible image on recording paper, on the basis of data, such as the information on printing, sent from the host computers 1 to 3. As mentioned above, the monitoring means is provided in the data communicating portion 42 of the thus-constructed printing system 4. It always monitors the reception level of a carrier signal transmitted from external units (the host computers 1 to 3 in this embodiment). A power controlling means controls power operating means (the power operating portion 43 in this embodiment) so that the power operating portion 43 can turn printing means on and off. This control is based on the output from the monitoring means and the status of the line switching means for the host computers. As mentioned previously, the power controlling means and the line switching means are also provided in the data communicating portion 42 in this embodiment. In this way, power to the printing system 4 can be automatically interrupted in accordance with the status of data transmission from the external units.

The power controlling means also controls the power operating means so that the power operating means can control power supply to the printing means. It is therefore possible at any time to arbitrarily turn the power to the printing system on and off in a remote-control manner.

The power controlling means cannot interrupt the power to the printing system in a remote-control manner until a printing process in progress is completed.

[Process for turning power on and off when a plurality of host computers are used]

(1) Conditions for turning power to printing system off
  <1> when the levels of all carrier waves whose frequencies are being scanned fall more than a predetermined value for more than a fixed amount of time:

In such a case, first, a determination is made that the power is turned off to all host computers used for the printing system 4. Then, another determination is made whether or not a job is in a printing process. If it is not in the printing process, the power is interrupted. If a job is in the printing process, it is first completed. As soon as the job is completed, a power-off signal is output to the power operating portion 43 of the printing system 4 so as to interrupt the power.

<2> when a receiving queue in the data communicating portion 42 is empty and when a power-off command is issued from the connected host computer to the printing system 4:

In such a case, the power-off command is interpreted by the data communicating portion 42. A job in the printing process is first completed. As soon as the job is completed, the data communicating portion 42 outputs the power-off signal to the power operating portion 43 so as to interrupt the power. However, if a value enters the receiving queue before the job in the printing process is completed, the power-off command which has been issued is cancelled.

(2) Conditions for turning power to printing system on <1>
  when the level of a carrier wave whose frequency is being scanned rises more than a predetermined value for more than a fixed amount of time, this scanning being carried out by a scanning process in the data communicating portion 42:

In such a case, a determination is made that power to any one of the host computers is turned on. The data communicating portion 42 outputs a power-on signal to the power operating portion 43 so as to turn the printing system 4 on. Thus, when the level of a carrier wave, whose frequency is being scanned, sent from any one of the host computers is detected, the power to the printing system 4 is not interrupted. Once the power is turned off on the basis of the power-off command, it cannot be turned on.

<2> when any one of the host computers issues a power-on command to the printing system 4 while the system 4 is turned off:

In such a case, the power-on command is interpreted and executed by the data communicating portion 42. The data communicating portion 42 in turn outputs the power-on signal to the power operating portion 43 so as to turn the printing system 4 on.

[Process for switching a line to host computers]

Figure 2:
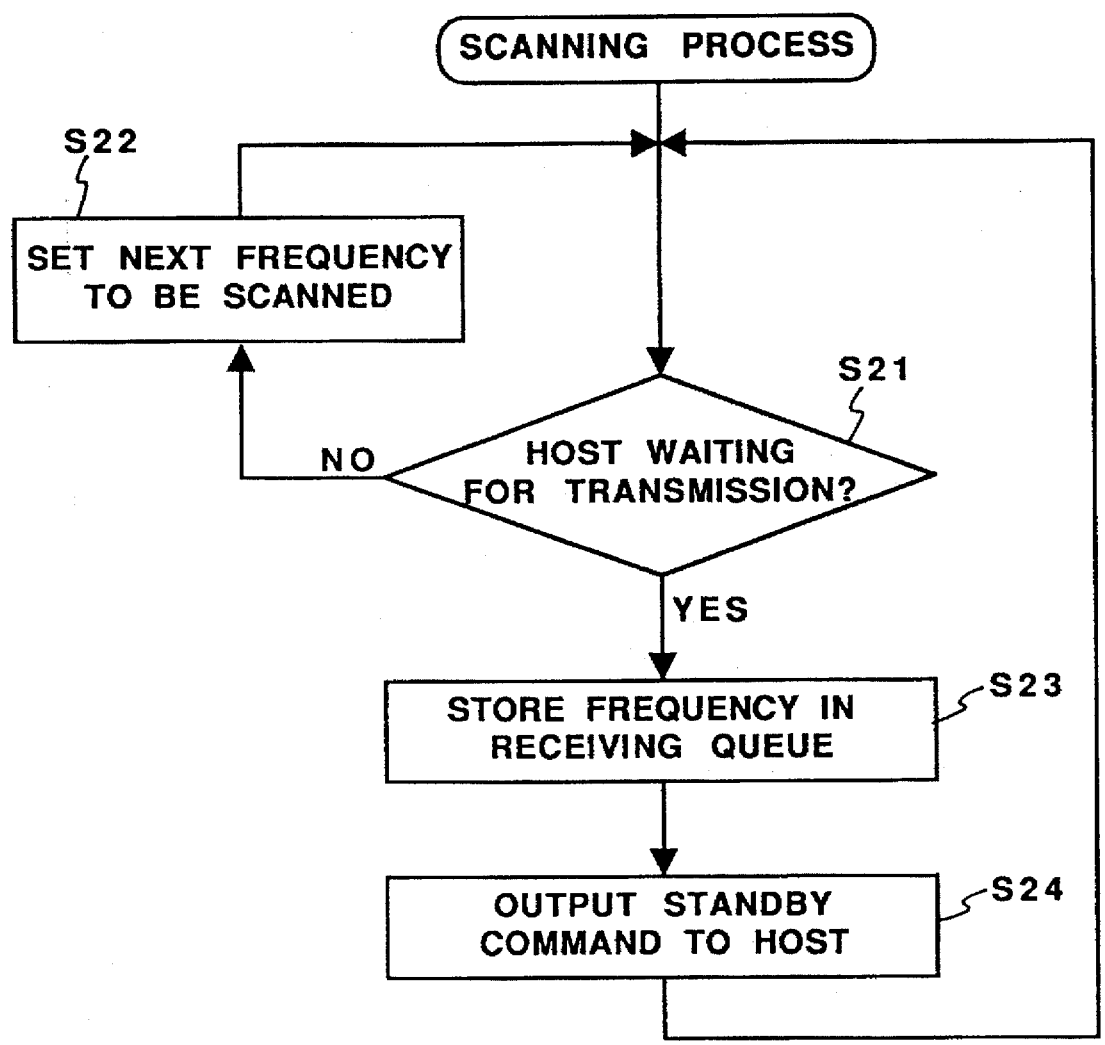
FIG. 2 is a flowchart showing steps of a scanning process performed by the radio printing system according to this invention.
Figure 3:
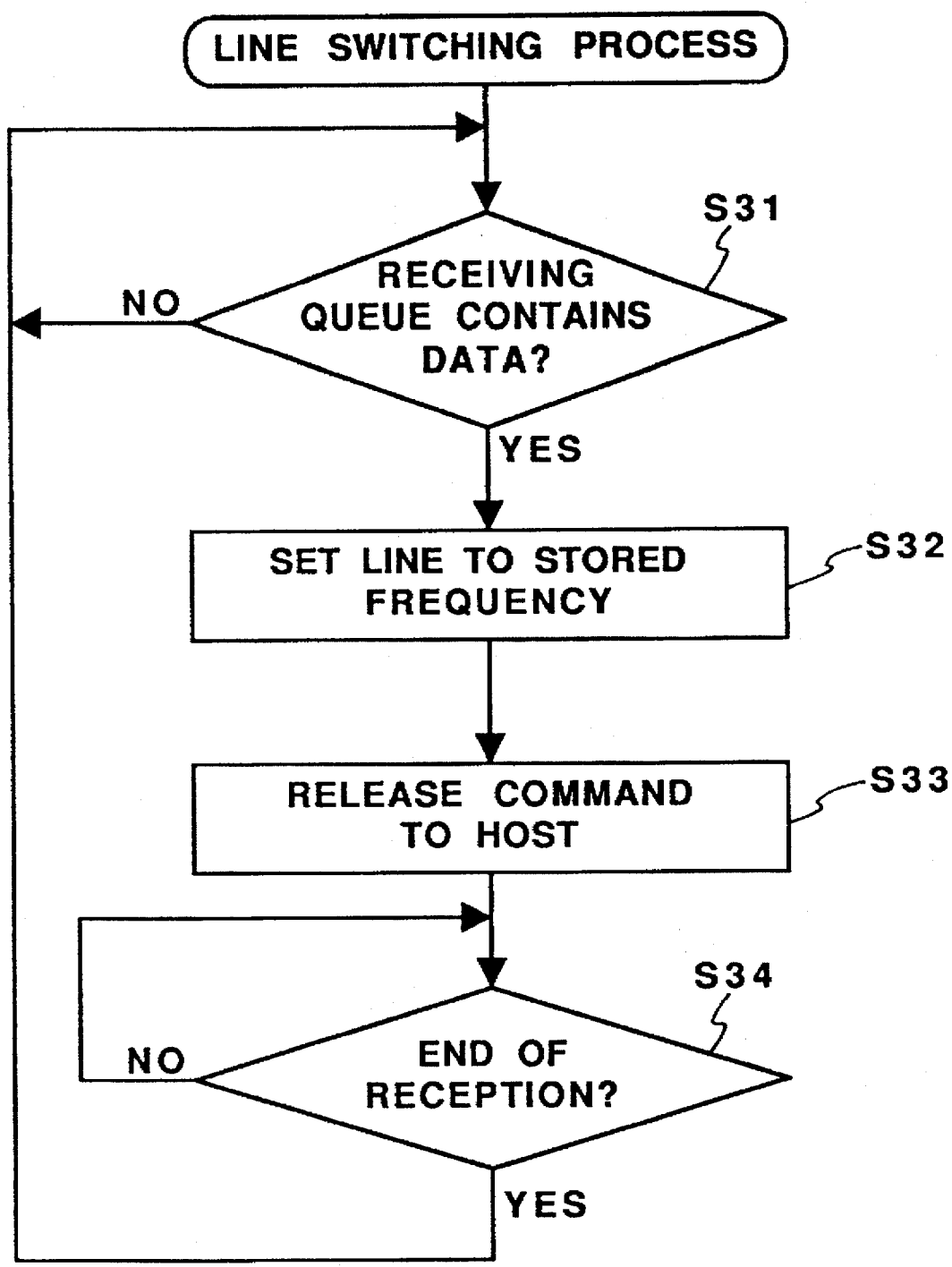
FIG. 3 is a flowchart showing a line switching process performed by the radio printing system according to this invention.

With reference to FIGS. 2 and 3, a description will be given of a process in which a line is switched to a plurality of host computers used for the printing system 4 of this invention. Such a process basically includes a scanning process and a line switching process, both of which are executed in parallel.

FIG. 2 is a flowchart showing steps of the scanning process performed by the printing system of this invention.

When the host computers 1 to 3 are in communication at frequencies specific to such computers, first, the reception level of a carrier wave is scanned at fixed intervals in a frequency band which is controlled by the printing system 4. Then, a determination is made whether there is any host computer waiting for data transmission (S21). If there is such a host computer, a frequency specific to this computer is stored in the receiving queue (S23). A standby command that the host computer wait until it is called by the printing system is output to the host computer (S24). The steps from S21 to S24 are then repeated. In step S21, if there is no host computer waiting for data transmission, a frequency to be scanned next time is set (S22). The steps from S21 to S24 are then repeated. The receiving queue is an FIFO queue: values stored first are processed sequentially by the line switching process, described later.

FIG. 3 is a flowchart showing the line switching process performed by the printing system of this invention.

The receiving queue is examined from the beginning whether there is any host computer in a wait condition, that is, whether the queue contains frequency data (S31). If the receiving queue contains frequency data, the frequency of the line is set at that of the host computer (S32). A standby command is released for a host computer demanding a printout, and then the line is connected to this host computer (S33). After the line has been connected, the host computer waits for the completion of the printout (S34). After the reception of data, the steps from S31 to S34 are repeated. During these steps, the scanning process continues.

Figure 4:
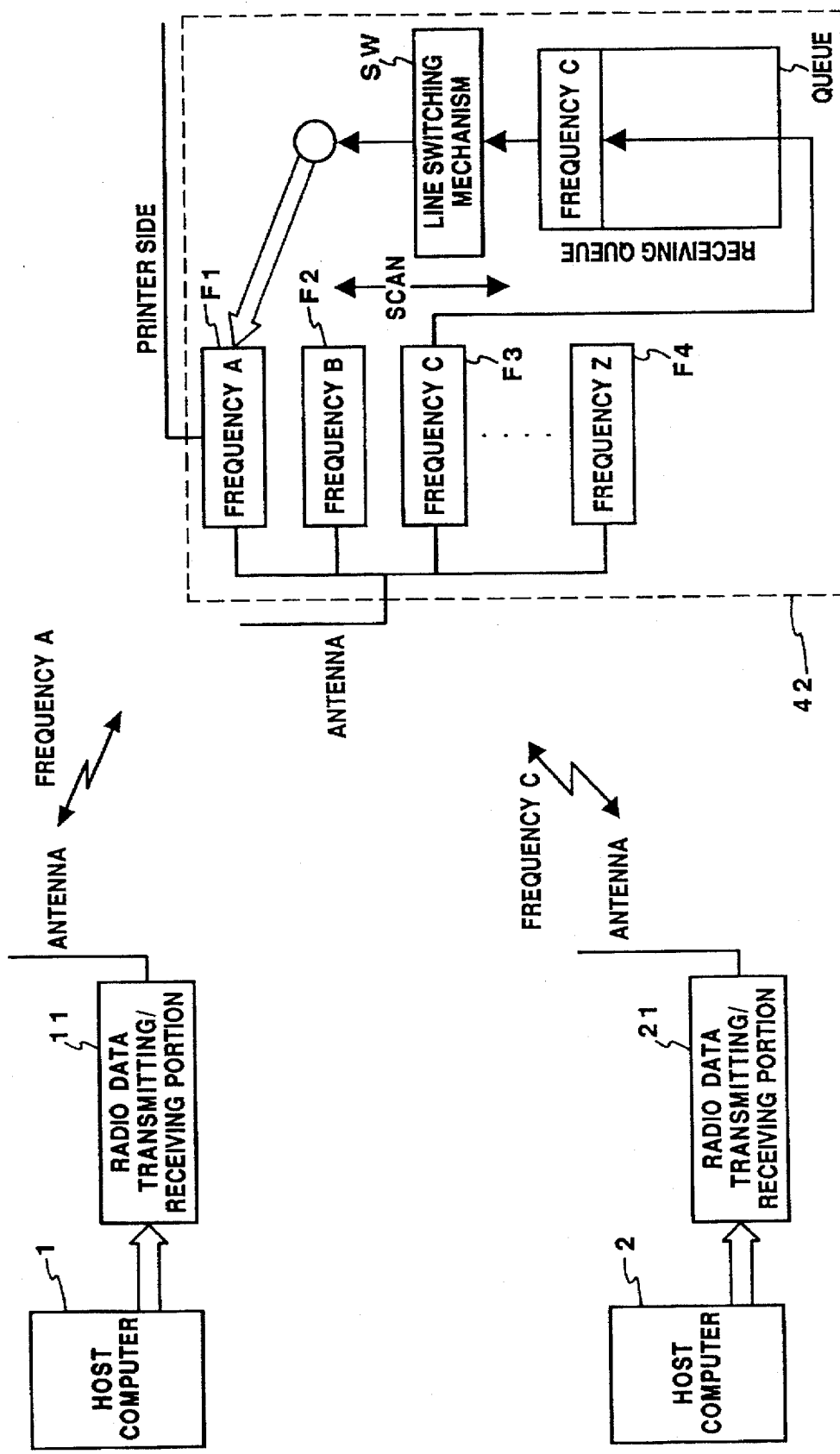
FIG. 4 is a detailed block diagram showing a structure of a radio data transmitting/receiving portion shown in FIG. 1.

FIG. 4 is a detailed block diagram showing a structure of a radio data transmitting/receiving portion shown in FIG. 1. In FIG. 4, identical symbols denote the same components as those shown in FIG. 1.

In FIG. 4, symbols F1 to F4 denote frequency selecting portions which select the reception levels of carrier waves at frequencies A to Z transmitted from three or more host computers. Symbol "QUEUE" denotes the receiving queue in which a frequency corresponding to a host computer waiting for data transmission is stored in an FIFO manner. Symbol "SW" denotes a line switching mechanism. When the frequency data is stored in the receiving queue QUEUE, the line is connected to a frequency selecting portion corresponding to this queue so that the frequency of the line is set. FIG. 4 represents the state in which while data is transmitted at frequency A, a request for transmitting data at frequency C is made.

The above embodiment has been described where the switch 43a of the power operating portion 43 is turned off in accordance with the types of processes mentioned above so that power to the entire printing system 4 is interrupted.

However, if power to the control portion 41 and the printer 44 is interrupted in phases, that is, more specifically, if power to the printer 44 is interrupted, for example, 30 seconds after carrier signals from all the connected host computers have faded out, and if power to the control portion 41 is interrupted 5 minutes thereafter, then when any host computer is turned on 3 minutes later, information, such as the contents of a font cache, preserved in an inside memory of the control portion 41 will not be erased. It is thus possible to increase a font cache hit ratio after printing has begun. It is also possible to interrupt power to the printer 44 in phases, thus reducing the time in which the printer 44 is on standby while the power is on.

The present invention is applied where a plurality of host computers which are all capable of automatically turning the printing system on and off in accordance with the status of a carrier wave transmitted from these computers. However, the number of host computers having such a function is not limited, and this invention may be equally applied where only one host computer has this function.

That is, when only the host computer 1, shown in FIG. 1, is capable of radio communication with the printing system 4, the monitoring means (the radio data transmitting/receiving portion 42 in this embodiment) always monitors the reception level of a carrier signal transmitted from the external unit (the host computer 1 in this embodiment). On the basis of the output from the monitoring means, the power controlling means (the data communicating portion 42 in this embodiment) controls the power operating means (the power operating portion 43) so that the power operating means can turn the power to the printing means (the printer 44) on and off. Thereby the power to the printing system 4 can be automatically interrupted in accordance with the status of data transmission from the external units.

The power controlling means (the data communicating portion 42 in this embodiment) also controls the power operating means (the power operating portion 43) so that the power operating means can control power supply to the printing means (the printer 44). It is therefore possible at any time to arbitrarily turn the power to the printing system on and off in a remote-control manner.

A process for turning power on and off will be described by dividing it into the following four modes.

(1) when power to the host computer 1 is turned off
(first mode in which power is turned on and off)

The data communicating portion 42 always monitors the reception level of a carrier wave required for radio communication with the host computer 1. A carrier wave for radio communication purposes is not limited to a specific medium in this embodiment, but may be used as long as it satisfies frequency characteristics, such as those of radiowaves, ultrasonic waves and light beams. If the reception level falls more than a predetermined value for more than a fixed amount of time, a determination is made that the power to the host computer 1 is turned off. In such a case, the data communicating portion 42 outputs the power-off signal to the power operating portion 43 so as to interrupt the power to the printing system 4.

(2) when power to the host computer 1 is turned on
(second mode in which power is turned on and off)

In the same manner as in the first mode, if the reception level rises more than a predetermined value for more than a fixed amount of time, a determination is made that the power to the host computer 1 is turned on. In such a case, the data communicating portion 42 outputs the power-on signal to the power operating portion 43 so as to turn the printing system 4 on. However, once the power is turned off on the basis of the power-off command, it cannot be turned on.

(3) when the host computer 1 issues the power-off command (third mode in which power is turned on and off)

When the host computer 1 issues the power-off command to the printing system 4 while the system 4 is turned on, this command is interpreted and executed by the data communicating portion 42. The data communicating portion 42 in turn outputs the power-off signal to the power operating portion 43 so as to interrupt the power to printing system 4.

(4) when the host computer 1 issues the power-on command (fourth mode in which power is turned on and off)

When the host computer 1 issues the power-on command to the printing system 4 while the system 4 is turned off, this command is interpreted and executed by the data communicating portion 42. The data communicating portion 42 in turn outputs the power-on signal to the power operating portion 43 so as to turn the power to printing system 4 on.

With reference to the flowcharts shown in FIGS. 5A and 5B, a description will be given of a process for turning power on and off to other components of the printing system of this invention.

Figure 5A:
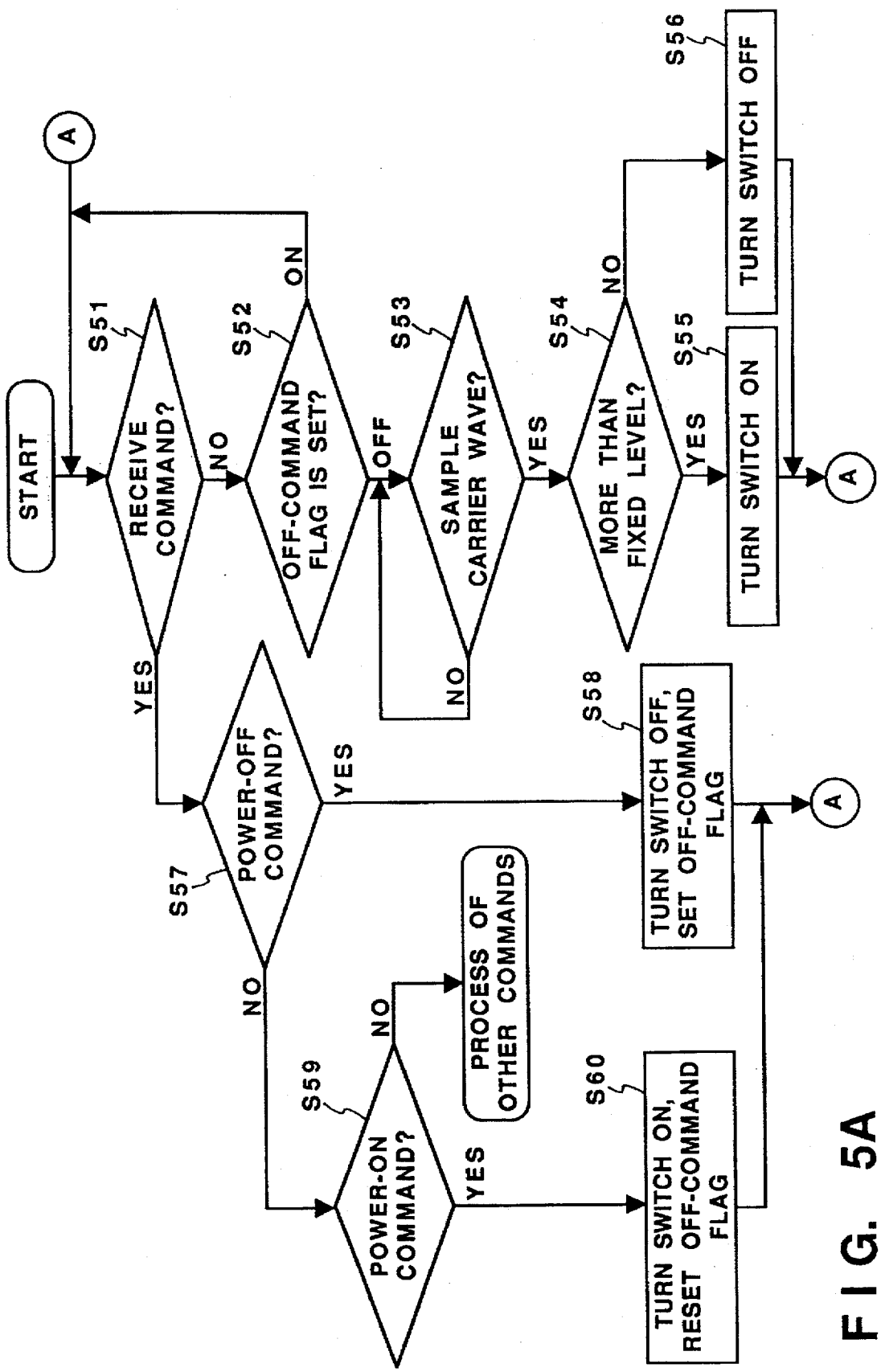
FIGS. 5A and 5B are flowcharts showing a process for turning on and off power to the radio printing system of this invention.

FIG. 5A is a flowchart showing the process in which the power to other components of the printing system is turned on and off. Of all host computers shown in FIG. 1, only the host computer 1 is capable of radio communication with the printing system 4.

The data communicating portion 42 always monitors the carrier wave transmitted by radio from the host computer 1. First, a determination is made whether a signal received contains a command (S51). If it does not contain the command, a determination is made whether an OFF-command flag is set or not set (S52). If it is not set, the carrier wave is sampled for a fixed amount of time (S53). A determination is made whether the signal level of the carrier wave received exceeds a fixed value (S54). If it does, the data communicating portion 42 sends the power-on signal to the power operating portion 43. This signal turns the switch 43a on (S55). The process then returns to the step S51.

On the other hand, if the signal level of the carrier wave received does not exceed the fixed value (S54), the data communicating portion 42 sends the power-off signal to the power operating portion 43. This signal turns the switch 43a off (S56), thus interrupting the power to the printer. The process then returns to the step S51. If the OFF-command flag is set (S52), the process returns directly to step S51.

If the signal received contains the command (S51), a determination is made whether or not this command is the power-off command (S57). If it is, the data communicating portion 42 sends the power-off signal to the power operating portion 43. This signal turns the switch 43a off, and the OFF-command flag is thereby set (S58). The process returns to step S51.

On the contrary, if the command is not the power-off command (S57), a determination is made whether or not the command is the power-on command (S59). If it is not, another process is performed. If it is, the data communicating portion 42 sends the power-on signal to the power operating portion 43. This signal turns the switch 43a on, and thereby the OFF-command flag is not set (S60). The process returns to step S51.

Figure 5B:
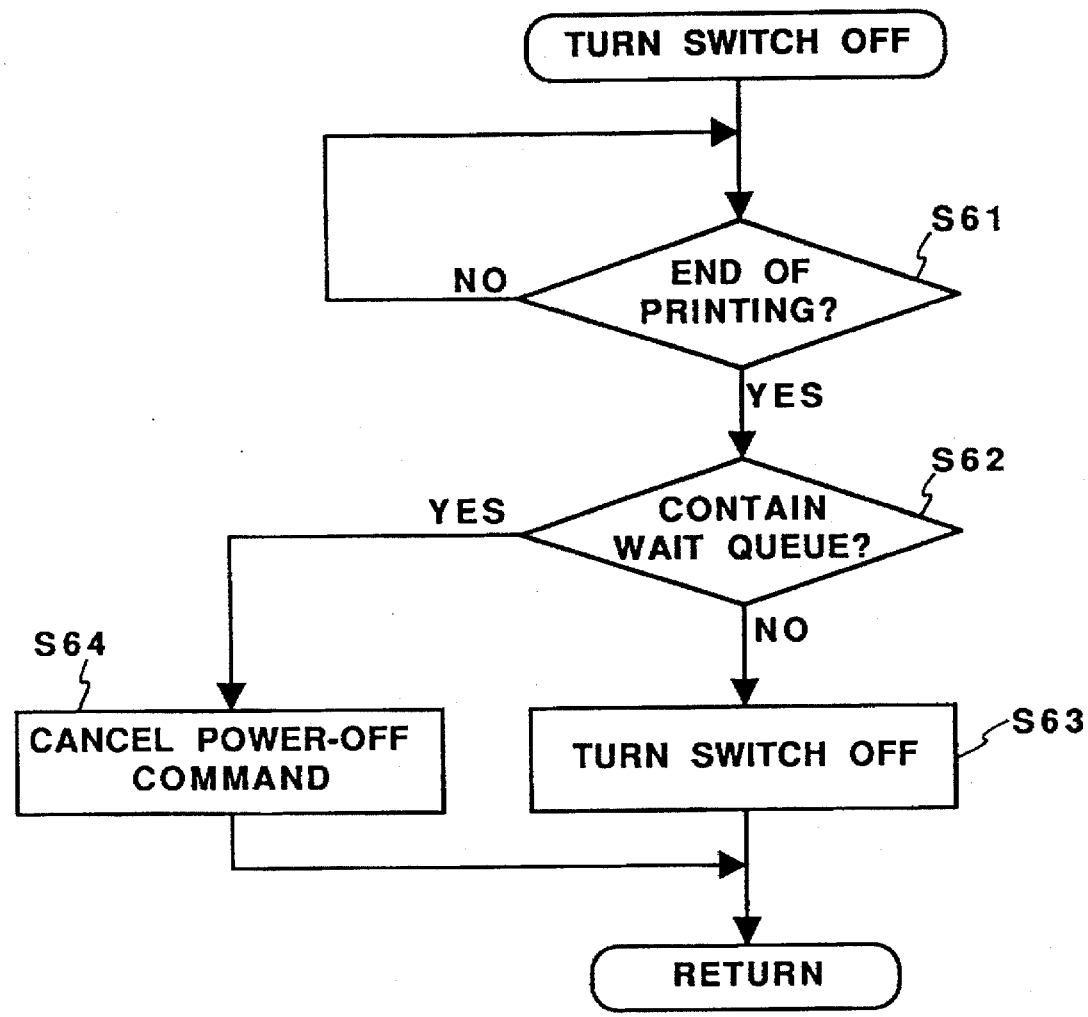

FIG. 5B is a flowchart showing a process for turning the switch off.

First, a printing process in progress is completed (S61). A determination is made whether or not the receiving queue QUEUE contains a wait queue (S62). If it does not, the switch is turned off (S63). If it does, the power-off command is cancelled (S64).

The present invention is applied to the above embodiment in which power to a single printing system is turned on and off when it is in radio-communication with a plurality of host computers. However, this invention may also be readily applied where a plurality of host computers can identify a plurality of printing systems. It is possible to easily control power supply to the printing systems, and to reduce power consumption in proportion to the number of printers.

As has been described above, the present invention provides a printing system which comprises the line switching means, the monitoring means, the power operating means and the power controlling means. The line switching means is used for switching a line to a plurality of external units; the monitoring means is used for monitoring the reception level of a carrier signal transmitted from the external units; the power operating means is used for turning power to the printing means on and off; and the power controlling means is used for controlling the power operating means so that the power operating means turns the power to the printing means on and off on the basis of the outputs from the line switching and monitoring means. Because of the above provision, even with a computer system in which a plurality of external units, such as host computers, are arranged in areas remote from a printing system, an operator can reliably turn power to the printing system on and off when power to the host computers is turned on and off.

This invention also provides a printing system which comprises the monitoring means, the power operating means, and the power controlling means for controlling the power operating means so that the power operating means turns the power to the printing means on and off on the basis of the output from monitoring means. Because of the above provision, the same advantages as those just described above can be obtained.

It is thus possible to reduce the frequency with which an operator at an external unit remote from the printing system turns power to the printing system on and off, and to prevent problems, such as those caused by failing to turn power off. Because no wiring is necessary, there is a reduction in cost, and a location for installing the printing system can be selected arbitrarily. This invention makes it possible to provide a more attractive office without wire.

As mentioned previously, the present invention provides an information processing system which comprises the line switching means, the monitoring means, the power operating means and the power controlling means. Because of the provision mentioned above, at any time it is possible to turn power to the printing means on and off, and therefore to appreciably reduce the power consumption of the printing means.

As described above, this invention also provides an information processing system which comprises the monitoring means, the power operating means, the power controlling means, and the power controlling means for controlling the power operating means so that the power operating means turns the power to the printing means on and off on the basis of a power control command transmitted by radio from the external unit. Because of the provision, the same advantages as those just described above can be obtained.

The power controlling means does not interrupt power to the printing system until a printing process in progress is completed. Therefore, even when the printing system is carrying paper, the paper is fed out without being jammed.

It is possible to move or arrange the printing system separately from one or more external units at any time. Components in the printing system can be arranged freely, and the problem of controlling power supply to the printing system is solved.

A description will be given of a method of selecting a printing system in a computer system composed of a plurality of host computers and printing systems.

[Function for selecting a slave unit]

Figure 6:
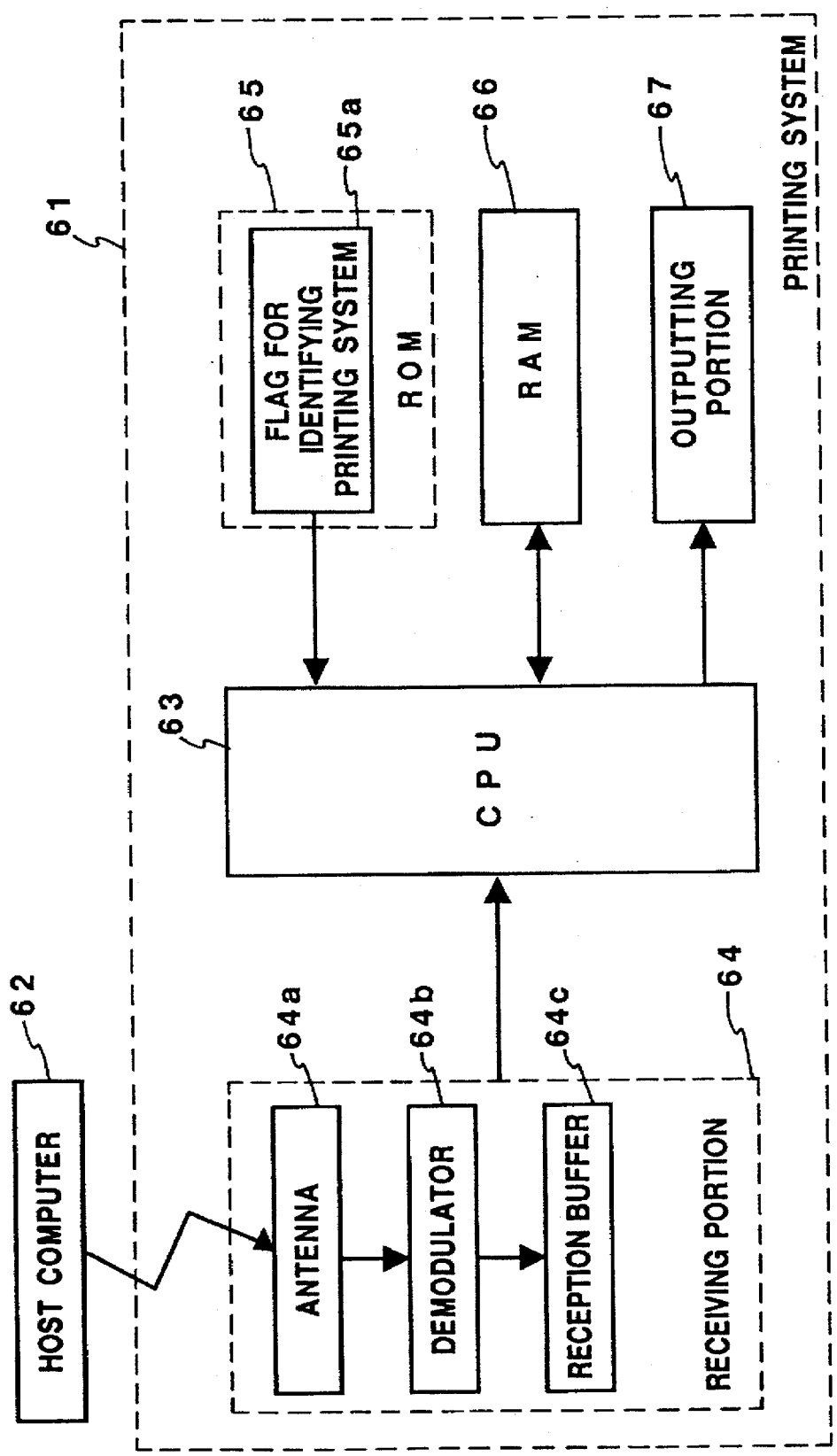
FIG. 6 is a block diagram showing a structure of a radio printing system in accordance with a second embodiment of this invention.

FIG. 6 is a block diagram illustrating a structure of a printing system in accordance with a second embodiment of this invention.

A printing system 61 indicated by a broken line in FIG. 6 is connected through a radiowave signal to an external host computer 62. It receives commands and the like from the host computer 62, thus printing out data. A data receiving portion 64, a ROM element 65, a RAM element 66, an outputting portion 67 and a power supply device (not shown) are all connected to a CPU 63 that controls the printing system 61. The data receiving portion 64 receives data from the host computer 62 through the radiowave signal. Programs and the like for executing a series of controls, explained later, are stored in the ROM element 65. The RAM element 66 functions as a work area when the CPU 63 executes the programs. The outputting portion 67 prints out image data. The data receiving portion 64 includes an antenna 64a for receiving the radiowave signal from the host computer 62, a demodulator 64b for converting the radiowave signal received to data, and a reception buffer 64c for temporarily storing the data received. The ROM element 65 includes a printer ID information flag 65a.

The operation of the thus-constructed printing system will now be explained with reference to FIG. 7, which is a flowchart showing a selecting process performed by the printing system according to the second embodiment of this invention.

Figure 7:
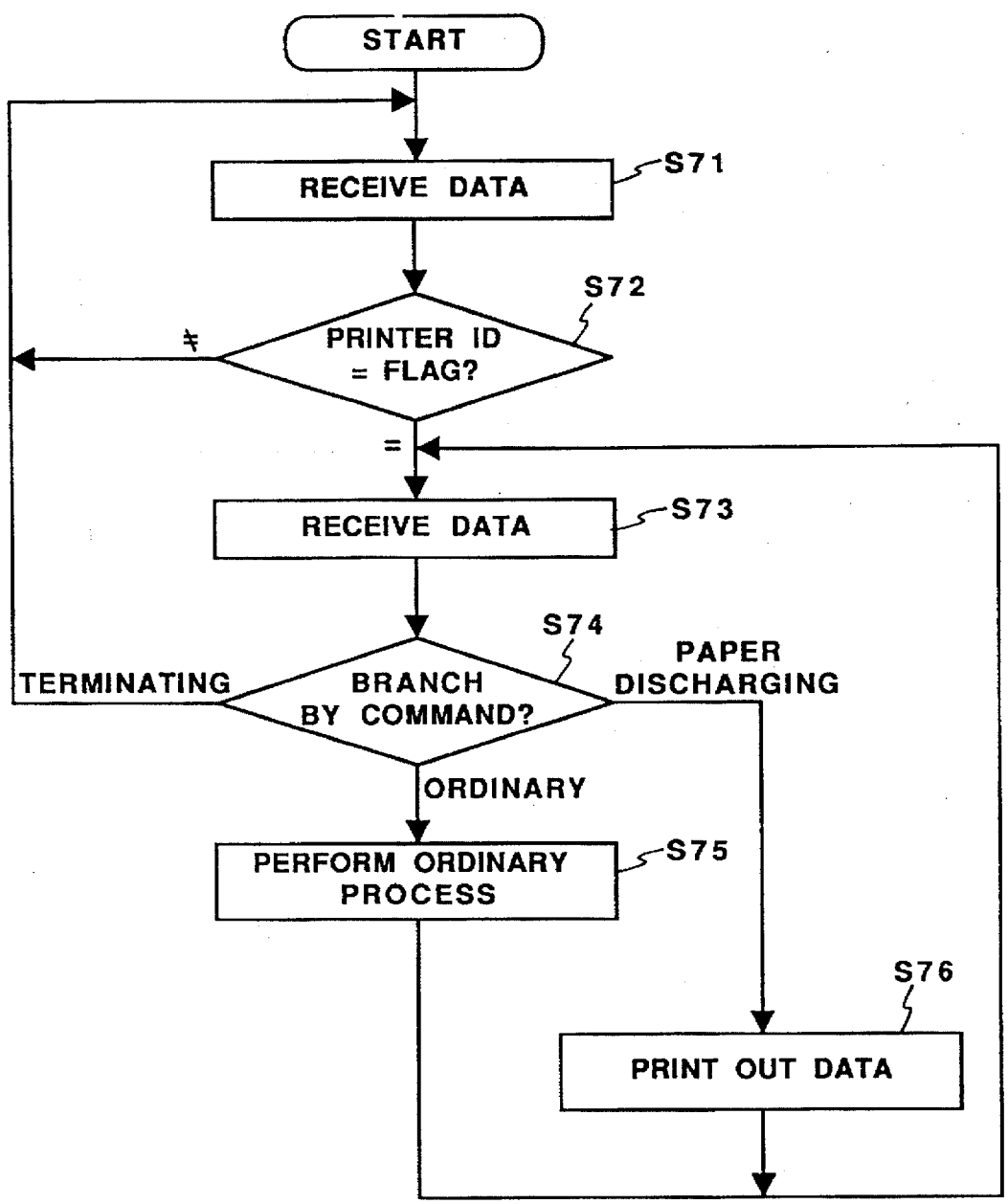
FIG. 7 is a flowchart showing a selecting process performed by the radio printing system according to the second embodiment of this invention.

As shown in FIG. 7, when power is supplied to the printing system 61, the antenna 64a inside the data receiving portion 64 receives a radiowave signal form the host computer 62 in step S71. The demodulator 64b demodulates the signal to data which in turn is stored in the reception buffer 64c. Data in an amount equal to one unit is read from the reception buffer 64c. In step S72 the value of the printer ID information contained in this data is compared with the value of the printer ID information flag 65a. If these two values are not equal, the process returns to step S71, where the antenna 64a waits for the input of another radiowave signal.

If these two values are equal, the process proceeds to step S73, where the antenna 64a inside the data receiving portion 64 receives another radiowave signal from the host computer 62. The demodulator 64b demodulates the signal to data which in turn is stored in the reception buffer 64c. Data in an amount equal to one unit is read from the reception buffer 64c. In step S74 a determination is made whether this data has an ordinary, paper discharging or terminating command. If it has the ordinary command, a process based on this command is performed in step S75, and the process returns to the step S73. If the data has the paper discharging command in step S74, it is printed out in step S76, and then the process returns to step S73. On the other hand, if the data has the terminating command in step S74, the process returns directly to step S71, where the antenna 64a waits for the input of another radiowave signal.

Although the printer ID information flag is contained in the ROM in this embodiment, it may also be contained in an involatile RAM so that it can be rewritten.

In this embodiment, though the printer ID information is contained at the beginning of each set of data sent from the host computer, it may also be contained in each command. If the printer ID information contained in a command does not agree with the printer ID information flag 65a, this command may be skipped. A printer ID command may be provided, and only when this command is issued, will the printer ID information be compared with the printer ID information flag 65a. If they do not agree with each other, the printer ID command may be skipped until another printer ID command is received.

Alternatively, when the printer ID information agrees with the printer ID information flag 65a, the frequency is automatically switched over to a second frequency so as to avoid interference with other units. A frequency changing command may be included in the printer ID information.

It may also be possible that when the printer ID information agrees with the printer ID information flag 65a, a response may be transmitted to the host computer.

As has been described above, the printing system of this invention possesses a means for determining whether printer ID information agrees with printer ID information sent from the host computer. A determination is made whether the printing system performs a process in accordance with the printer ID information from the host computer. By using a single type of frequency, a printing system to be used can be specified, and therefore repetition of the process can be eliminated.

A third embodiment will be described below in which a computer system expanded into a system including various types of host computers.

(Configuration composed of general-purpose slave units)

Figure 8:
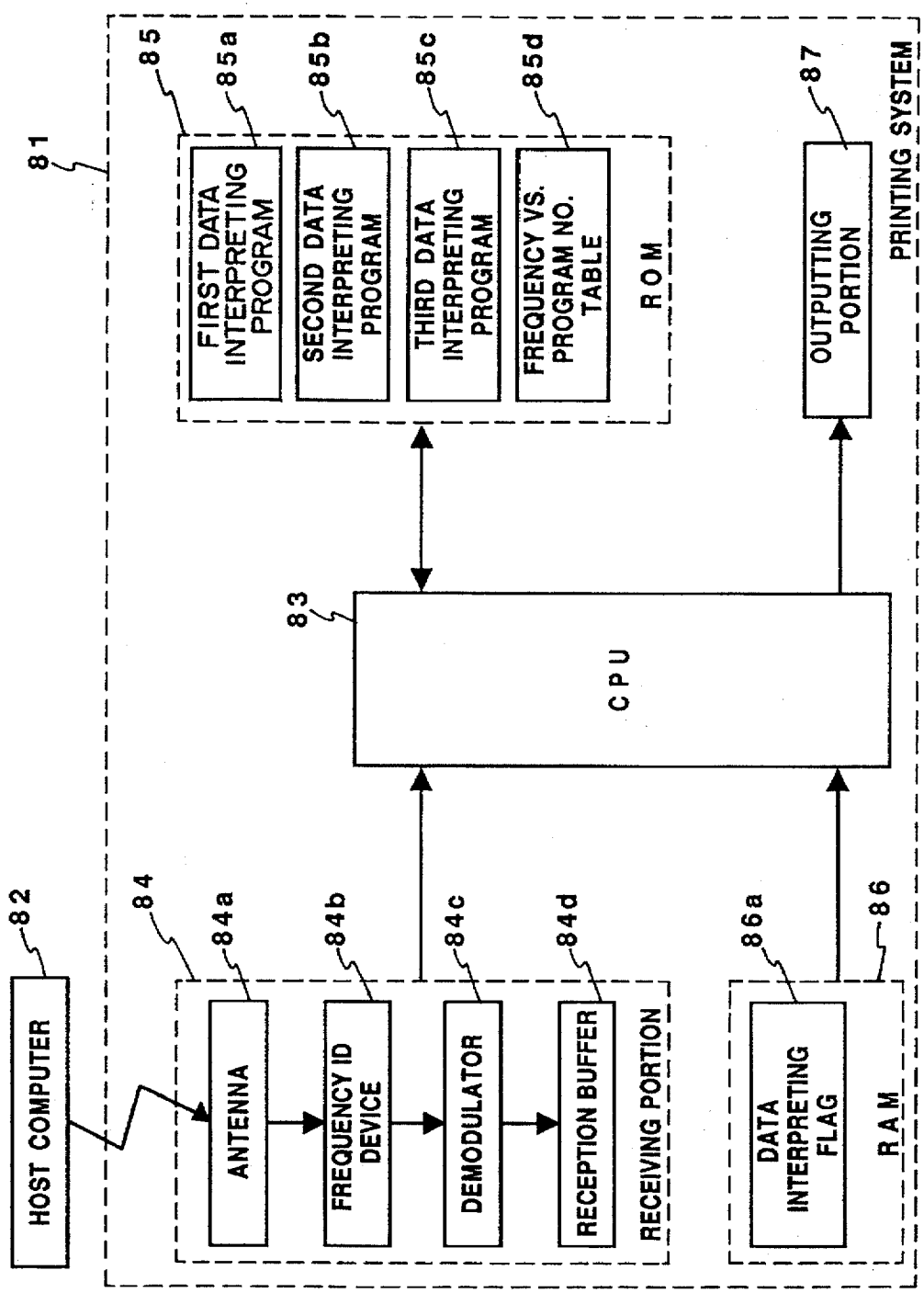
FIG. 8 is a block diagram showing a structure of a radio printing system in accordance with a third embodiment of this invention.

FIG. 8 is a block diagram showing a structure of a printing system in accordance with the third embodiment of this invention. The printing system 81 indicated by a broken line in FIG. 8 is connected to an external host computer 82 which transmits data at a specific carrier frequency, described later. It receives commands and the like, and prints out data. In this embodiment, one host computer may transmit data at a plurality of specific carrier frequencies; or a plurality of computers, each having a dedicated frequency, may transmit data. It is possible for the printing system 81 to use a specific carrier frequency according to the contents to be processed.

A data receiving portion 84, a ROM element 85, a RAM element 86, an outputting portion 87 and a power supply device (not shown) are all connected to a CPU 83 that controls the printing system 81. The data receiving portion 84 receives data from the host computer 82 through a radiowave signal. Programs and the like for executing a series of controls, explained later, are stored in the ROM element 85. The RAM element 86 functions as a work area when the CPU 83 executes the programs. The outputting portion 87 prints out image data.

The data receiving portion 84 includes an antenna 84a for receiving the radiowave signal from the host computer 82, a demodulator 84c for converting the radiowave signal received to data, a reception buffer 84d for temporarily storing the data received, and a frequency ID device 84b. At fixed time intervals the frequency ID device 84b scans a portion of the frequency of a signal being received, and identifies this frequency as a reception frequency if the level of the signal is higher than a predetermined level. The ROM element 85 includes data interpreting portions 85a, 85b and 85c and a frequency-program table 85d. The frequency-program table 85d is a table which contains ID numbers of three data interpreting programs corresponding to the specific frequencies. The three data interpreting programs are composed of first, second and third data interpreting programs, and correspond to the three data interpreting programs. A data interpreting flag 86a is contained in the RAM element 86, and indicates the ID number of a data interpreting program being executed.

The operation of the thus-constructed printing system 81 will now be described with reference to FIG. 9, which is a flowchart showing a process in which the data interpreting portions in the printing system according to the third embodiment are switched. As shown in FIG. 9, when power is fed to the printing system 81, the data interpreting flag is set at "0" in step S91, and at the same time the first, second and third data interpreting programs are initialized. In step S92 the antenna 84a inside the data receiving portion 84 receives the radiowave from the host computer 82. The frequency ID device 84b specifies the frequency of a radiowave being received. The demodulator 84 demodulates the radiowave to data which in turn is stored in the reception buffer 84d. Data in an amount equal to one unit is read from the reception buffer 84d. In step S93 the ID number of a data interpreting program corresponding to the specified frequency is retrieved from the frequency-program table 85d. In step S94 this ID number is compared with the value of the data interpreting flag 86a.

In step S94 if the ID number of the data interpreting program does not agree with the value of the data interpreting flag 86a, another number is rewritten to the flag 86a and the data interpreting programs are initialized in step S95. In step S96 data stored in the data interpreting portion 85a, 85b or 85c is interpreted in accordance with the ID number of the data interpreting program. The data is then output to the outputting portion 87. The process returns to the step S92. On the other hand, in step S94 if the ID number agrees with the value of the flag 86a, the process proceeds directly to step S96, where data stored in the data interpreting portion 85a, 85b or 85c, which has not been initialized, is interpreted. The data is then output to the outputting portion 87. The process returns to the step S92.

In this embodiment, at fixed time intervals the frequency ID device (frequency identifying means) continuously scans a portion of the frequency of a signal being received, and identifies this frequency as a reception frequency if the level of the signal is higher than a predetermined level. This frequency identifying means, however, may intermittently scan frequencies corresponding to predetermined data interpreting portions. Alternatively, a plurality of receiving portions having different reception frequencies may be provided in this invention. Data is received simultaneously, and the frequency of a receiving portion that actually receives the data is identified as a reception frequency.

Although three data interpreting portions are provided in this embodiment, the number of data interpreting portions is not limited as long as it is two or more. To switch the three data interpreting portions, the three data interpreting programs assigned to these portions are changed. However, instead of using such programs, the hardware may also be changed to switch the data interpreting portions.

As has been described above, the present invention can provide an information processing system capable of switching the data interpreting portions by simply identifying the frequency of a carrier wave for transmitting data.

This invention can also provide an information processing system capable of using a frequency to switch the data interpreting portions, without depending on language systems or data interpretation.

Radiowaves are used as carrier waves for transmitting data from the host computer to the printing system in the embodiments described above. However, sound waves, supersonic waves, infrared rays, ultraviolet rays, visible rays or laser beams may also be used as carrier waves as long as they have a frequency. In reality it is preferable that supersonic waves or radiowaves be used. Long waves, medium waves, short waves, ultrashort waves or micro waves may be used as radiowaves. However, it is desirable that waves having a frequency higher than that of ultrashort waves be used.

Changes, additions and modifications to the present invention are possible as long as they are within the scope of the appended claims, and are within the scope of this invention.

What is claimed is:

1. A print control apparatus comprising:
   first determining means for determining whether or not data transmitted from an external device is a power-off command;
   first control means for turning off a power supply to printing means when said determining means determines that the data from the external device is the power-off command;
   detecting means for detecting a signal transmitted from the external device prior to a data transmission;
   means for discriminating whether the power supply to the printing means has been turned off by the power-off command from the external device;
   second control means for, in response to an output of the detecting means, turning on the power supply to the printing means when a discrimination of the discriminating means is negative, and for, even if the signal is transmitted from the external device prior to a data transmission, leaving the power supply off when the discrimination of the discriminating means is positive.

2. The control apparatus according to claim 1, wherein said first control means turns off the power supply to the printing means after a printing operation on the printing means is completed.

3. The control apparatus according to claim 1, wherein the external device transmits signal with a carrier wave as the signal transmitted from the external device prior to a data transmission, and wherein the detecting means comprise:
   means for monitoring a reception level of the carrier wave; and
   means for determining whether or not a monitored reception level is larger than a predetermined level.

4. The control apparatus according to claim 1 further comprising:
   second determining means for determining whether or not data transmitted from said external device is a power-on command; and
   third control means for turning on the power supply to said printing means when a determination of said second determining means is affirmative.

5. The control apparatus according to claim 1, further comprising:
   fourth control means for turning off the power supply to said printing means when the signal is not detected by said detecting means.

6. A method for controlling a power supply to printing means comprising the steps of:
   first determining whether or not data transmitted from an external device is a power-off command;
   first turning off a power supply to said printing means when the data from the external device is determined to be the power-off command;
   detecting a signal transmitted from the external device prior to a data transmission;
   discriminating whether the power supply to the printing means has been turned off by the power-off command from the external device;

first turning on, in response to a detection of the signal, the power supply to the printing means when a discrimination in the discriminating step is negative; and leaving the power supply off when the discrimination is positive, even if the signal is transmitted from the external device prior to a data transmission.

7. The method according to claim 6, wherein the power supply to the printing means is turned off in the turning off step after a printing operation on the printing means is completed.

8. The method according to claim 6, wherein the external device transmits a signal with a carrier wave as the signal transmitted from the external device prior to a data transmission, and wherein the detecting step comprises the steps of:

monitoring a reception level of the carrier wave; and secondly determining whether or not a monitored reception level is larger than a predetermined level.

9. The method according to claim 1 further comprising the step of:

thirdly determining whether or not data transmitted from said external device is a power-on command; and secondly turning on the power supply to said printing means when a determination of said third determining step is affirmative.

10. The method according to claim 6 further comprising:

secondly turning off the power supply to said printing means when the signal is not detected by said detecting means.

* * * * *

UNITED STATES PATENT AND TRADEMARK OFFICE
CERTIFICATE OF CORRECTION

PATENT NO. : 5,696,499

DATED : December 9, 1997

INVENTOR(S): SHUNYA MITSUHASHI ET AL.

It is certified that error appears in the above-identified patent and that said Letters Patent is hereby corrected as shown below:

ON THE TITLE PAGE:

[63] RELATED U.S. APPLICATION DATA

"Nov. 21, 1991" should read --Nov. 12, 1991--.

[57] ABSTRACT

Line 9, "information." should read --information. The slave unit identifies a frequency receives data corresponding to the frequency, and performs the specific information process on the basis of the data received at this frequency. The information processing system, especially that of a slave unit and the host units, thus construed and controlled is capable of operating efficiently, without wasting electric power.--.

COLUMN 6

Line 30, "fall more" should read --becomes less--.
Line 53, "<1>" should be deleted.
Line 54, "when" should read --<1> when--.

COLUMN 8

Line 6, Close up right margin.
Line 7, Close up left margin.
Line 15, "where" should read --to--.
Line 53-54, "falls more" should read --becomes less--.

UNITED STATES PATENT AND TRADEMARK OFFICE
CERTIFICATE OF CORRECTION

PATENT NO. : 5,696,499

DATED : December 9, 1997

INVENTOR(S) : SHUNYA MITSUHASHI ET AL.

It is certified that error appears in the above-identified patent and that said Letters Patent is hereby corrected as shown below:

COLUMN 11

Line 34, "form" should read --from--.

COLUMN 12

Line 25, "expanded" should read --is expanded--.

COLUMN 14

Line 35, "signal" should read --a signal--.

Signed and Sealed this

Fourth Day of August, 1998

Attest:

BRUCE LEHMAN

Attesting Officer

Commissioner of Patents and Trademarks